(12) United States Patent  
McBreen et al.

(10) Patent No.: US 7,921,213 B1
(45) Date of Patent: Apr. 5, 2011

(54) RING CONTENT DISTRIBUTION SYSTEM

(75) Inventors: James R. McBreen, Shoreview, MN (US); Laura M. Nissen, Andover, MN (US)

(73) Assignee: Unisys Corporation, Blue Bell, PA (US)

( * ) Notice: Subject to any disclaimer, the term of this patent is extended or adjusted under 35 U.S.C. 154(b) by 2723 days.

(21) Appl. No.: 10/255,448

(22) Filed: Sep. 26, 2002

(51) Int. Cl.
  *G06F 15/16* (2006.01)
(52) U.S. Cl. ........................................ 709/227; 709/217
(58) Field of Classification Search .......... 709/201–203, 709/217–219, 227–229, 238–244, 251
  See application file for complete search history.

(56) References Cited

U.S. PATENT DOCUMENTS

| | | | | |
|---|---|---|---|---|
| 5,121,389 | A * | 6/1992 | Faulkner | 370/452 |
| 5,884,031 | A * | 3/1999 | Ice | 709/203 |
| 5,930,473 | A * | 7/1999 | Teng et al. | 709/204 |
| 6,215,766 | B1 * | 4/2001 | Ammar et al. | 370/229 |
| 6,763,383 | B1 * | 7/2004 | Evison et al. | 709/224 |
| 2001/0042110 | A1 * | 11/2001 | Furusawa et al. | 709/219 |
| 2002/0065886 | A1 * | 5/2002 | Kim et al. | 709/205 |
| 2002/0136227 | A1 * | 9/2002 | Laarhuis et al. | 370/408 |
| 2003/0051051 | A1 * | 3/2003 | O'Neal et al. | 709/242 |

FOREIGN PATENT DOCUMENTS

| | | | |
|---|---|---|---|
| KR | 2003026706 A | * | 4/2003 |
| WO | WO 2005079369 A2 | * | 9/2005 |

OTHER PUBLICATIONS

Defcon Keeps Hackers Hooked, Jul. 16, 2001, printed from <http://www.wired.com/news/culture/0,1284,45248,00.html>.*
BitTorrent, printed from the Feb. 6, 2002 archive of <http://bitconjurer.org/BitTorrent>.*
BitTorrent architecture, printed from the Nov. 22, 2001 archive of <http://bitconjurer.org/BitTorrent/architecture.html>.*
Fiber Distributed Data Interface, printed from the Aug. 12, 2001 archive of <http://www.cisco.com/univercd/cc/td/doc/cisintwk/ito_doc/fddi.htm>.*
Data "swarms" could rescue overloaded web sites, Jan. 9, 2002, printed from <http://www.newscientist.com/article.ns?id=dn1761>.*
BitTorrent download, printed from the Aug. 6, 2002 archive of <http://bitconjurer.org/BitTorrent/download.html>.*
BitTorrent Protocol Documentation, printed from the Oct. 17, 2002 archive of <http://bitconjurer.org/BitTorrent/protocol.html>.*

(Continued)

*Primary Examiner* — Yasin Barqadle
(74) *Attorney, Agent, or Firm* — Richard J. Gregson; Beth L. McMahon

(57) ABSTRACT

A method of handing off connection requests from a file server to other receivers on a network includes receiving a connection request from a receiver, checking to see if the requested content is currently being provided by the file server to another receiver, and, if so, handing off the request to the another receiver.

16 Claims, 6 Drawing Sheets

OTHER PUBLICATIONS

BitTorrent 3.0 Screenshots, executable downloaded from <http://west.dl.sourceforge.net/sourceforge/bittorrent/bittorrent-3.0.exe>.*

Yahoo! message board post titled "2.3.1 out—BitTorrent has download resuming", dated Sep. 13, 2001, printed from <http://tech.groups.yahoo.com/group/BitTorrent/message/103>.*

Yahoo! message board post titled "publishing hangs", dated Aug. 14, 2001, printed from <http://tech.groups.yahoo.com/group/BitTorrent/message/68>.*

BitTorrent source code, dated Jul. 3, 2001.*

Wikipedia entry for BitTorrent, printed from <http://en.wikipedia.org/wiki/BitTorrent>.*

Yahoo! BitTorrent group post labeled "new release up" dated May 6, 2002, printed from <http://tech.groups.yahoo.com/group/BitTorrent/message/469>.*

Brian's BitTorrent FAQ and Guide, printed from <http://btfaq.com/serve/cache/56.html>.*

* cited by examiner

RING CONTENT DISTRIBUTION SYSTEM

CROSS-REFERENCES TO RELATED APPLICATIONS, IF ANY

None.

BACKGROUND OF THE INVENTION

1. Field of the Invention

This invention relates generally to computer networks. More particularly, it relates to content distribution systems for such networks.

2. Description of the Prior Art

Digital computer networks are designed to share information, most commonly files, between different work stations or receivers on the network.

One of the most common types of networks is called a "client/server" network. In this type of network, one group of stations, called "workstations" are connected to one or more of a different class of stations called "file servers". The workstations are typically locations at which where human beings interact with the network by doing word processing, mathematical calculations, viewing information on a monitor, designing spreadsheets and the like. The file servers are typically much fewer in number and are dedicated to storing and "serving up" files and other types of digital data for the users at the workstations to use. Since the workstations request and receive data from the file server, they are considered to be "clients" of the file server, hence the term "client/server".

In a typical work setting, each workstation typically stores the application programs that a user uses during his daily activities such as a word processing program, a spreadsheet program or an Internet browser. The user starts the computer, retrieves a file from the file server, edits that file, and stores the file back on the file server when finished. Since the application programs are used over and over again in the course of the users' work, they are stored inside the users' workstations. The files (e.g., letters, pictures, spreadsheets, web pages, and other documents) that the user creates or views are stored on the file server.

In environments using this common client/server network such as businesses, universities or other workplaces, the function of the file server is to maintain a common store of the working files the users create, edit, or otherwise access. The file server controls access to those files and provides additional administrative services such as quick backup, storage and archiving of the files. By keeping all the files created by the users in a single location, the knowledge created by the business as it exists in all the files created by the users can be carefully controlled, protected and organized.

To retrieve a file from a file server, a workstation typically sends a request over the network to a program on the file server that identifies the requesting workstation and the name or other identifying characteristics of the file that is to be retrieved. In response to this initial query, the file server program creates a logical "connection" between the file server and the workstation. The file server may set aside a portion of its memory to manage this connection until the requested file is completely transferred. To "serve" or transmit the file over the network the file server retrieves sequential portions of the file from its data storage device (typically a disk drive) and sequentially sends each portion to the requesting workstation where the portions are reassembled and held in the memory circuits of the workstation. Once the file has been completely transferred, the connection is typically closed. The file server releases the memory allocated to the connection, thereby filing it for use in processing other file requests.

There are several common characteristics to a typical client/server network in a business environment.

First, each connection has a relatively short life. It typically takes only a fraction of a second to open a connection, retrieve a file, transmit the file to the users' workstation, and close the connection. Thus, each connection exists for only a short time.

Second, each file is relatively small. For example, a file that contains a business letter may be only 20 kilobytes in size.

Third, the file server receives files from users and administrators while it is sending files out to the users. Thus, it must constantly change its store of files and be ready to send out modified files that it may have received from a user only a few minutes or seconds before.

Fourth, the number of files a file server is expected to serve can be quite large. A typical business or university file server may store tens or hundreds of thousands of files that it must serve up on a moments notice.

Fifth, requests for files from each individual workstation are relatively infrequent. A user who is editing a letter at a workstation may request and receive a draft letter from the file server in a tenth of a second, spend fifteen minutes editing the letter, and then spend another tenth of a second saving that revised letter back to the file server. In this example, the user and his workstation spend a thousand times as long editing the letter as the user spent communicating with the file server to retrieve and to save the letter.

Sixth, there are only a relative handful of users connected to (and requesting files from) each file server at one time. A typical business department may have only 50 or 100 users who are connected to a departmental file server and make requests on it. There may be many hundreds or thousands of other people who can connect to the file server over a wider LAN or WAN arrangement, but the requests from these additional users are only occasional since they are typically in different departments with different duties and their own local file servers handle the vast majority of their file storage and retrieval needs.

Given these common characteristics of a typical computing environment at work, it makes perfect sense to use a client/server arrangement in which (1) each workstation or receiver sends its own connection request over the network to the file server, (2) the file server and the workstation create an individual connection for serving that file, (3) the file is sent, and (4) the connection is broken.

In the last fifteen years, however, computer networks have been increasingly used to provide a different type of content to a different class of users than users in a traditional work setting. For example, computer networks have been proposed for serving up extremely large files, such as files containing songs, movies or television programs. In these networks, the data flow is typically one-way: from the file server to the user. The user requests a file not to receive it, store it, edit it and save it back to the file server, but to immediately watch or listen to it.

In these types of networks, the connection between the computer providing the file and the computer receiving the file must be maintained for the entire length of time that the user is interacting with his workstation.

This places an increased burden on the file server. In a typical work environment, a file server can service hundreds of file requests per minute. It creates connections, serves (or retrieves) files, and closes the connections in a fraction of a second. In these new networks, the file server must simultaneously maintain perhaps hundreds of connections, providing each connection and requesting work station with a virtually continuous flow of data for the entire time that the user is operating his workstation (or, rather "receiver" since the data flow is almost entirely one-way: from the server to the user). Maintaining many simultaneous connections and many large, simultaneous, and continuous data flows or "streams" places a heavy burden on a computer network using traditional client/server connection methods, since each transfer requires a long-lived connection on the file server and because each file server must therefore handle or service many more simultaneous connections. As a result, the file server and the network leg connecting the file server to the receivers can be over burdened.

What is needed therefore, is a method of distributing content over a computer network from one or more file servers to several workstations or other receivers that reduces the computing and network burden.

What is also needed is a method for offloading or handing off requests for data (and their corresponding connections) from the file server to other receivers that are receiving or have already received the requested content.

What is also needed is a method for determining whether newly requested content is already being provided to another receiver on the network and, if so, directing subsequent content requests to that receiver.

It is an object of this invention to provide each such method in one or more embodiments of the invention.

SUMMARY OF THE INVENTION

The present invention overcomes many of the disadvantages found within the prior art by providing a content distribution system that is particularly suited to multiple simultaneous duplicative data transfers to several receivers at once, such as video data streams, audio data streams, large files or the like.

In the preferred embodiment this capability is provided by handing off content (or file transfer) requests from one computer to another for servicing. The file request that is handed off is a duplicate of a previous request for the same content.

In this process, a file server receives a request from a receiver for particular content, such as a specific file or data stream. The file server honors this request by opening a connection to the requesting (first) receiver. Once opened, the file server begins transferring the requested content to the receiver, typically as a series of packets that are addressed to the receiver.

Once this first connection has been established, a second (or subsequent) request for the same content is transmitted from a second receiver to the file server. This time, however, the file server does not open a second connection to transmit the same content from the file server to the second receiver. The file server determines that the second request is for the same content as the first request, refuses the connection, and responds by telling the second receiver to go to the first receiver for the content. The server's response therefore denies the requested connection and identifies an alternate source of the content to the second receiver.

Alternatively, the process above includes further steps of connecting the second receiver with the first receiver for transmission of the content from the first receiver to the second receiver. For example, when the second receiver receives the response from the file server, it may send a request for the content to the first receiver based upon the response provided by the server. When the first receiver receives this request from the second receiver, it may begin transferring the content to the second receiver. The connection request has been "handed off" to the first receiver.

The process above provides an almost simultaneous transmission of the content to both the first and second receivers. The server transfers the content to the first receiver, which (having made a connection with the second receiver) forwards the content to the second receiver. It should be clear that more than two receivers can be daisy-chained in this fashion to allow a cascading transfer of the content from a server to a first receiver, from the first receiver to a second receiver, from the second receiver to a third receiver and so on.

The method described above is of particular value when distributing content on ring networks. In a ring network the first receiver to establish a connection is preferably downstream of the file server and upstream of the second receiver. One receiver is "upstream" of another receiver if the receivers are disposed in the ring network such that data can pass from the one receiver to the another receiver without being transmitted through the network node of the file server that provides the content.

It should be understood that the file server can establish multiple connections for multiple content transfers and can hand off connections for each of the content transfers. Thus, a file server can provide content to two or more chains of receivers that are established in the manner described above.

DETAILED DESCRIPTION OF THE INVENTION

Figure 1:
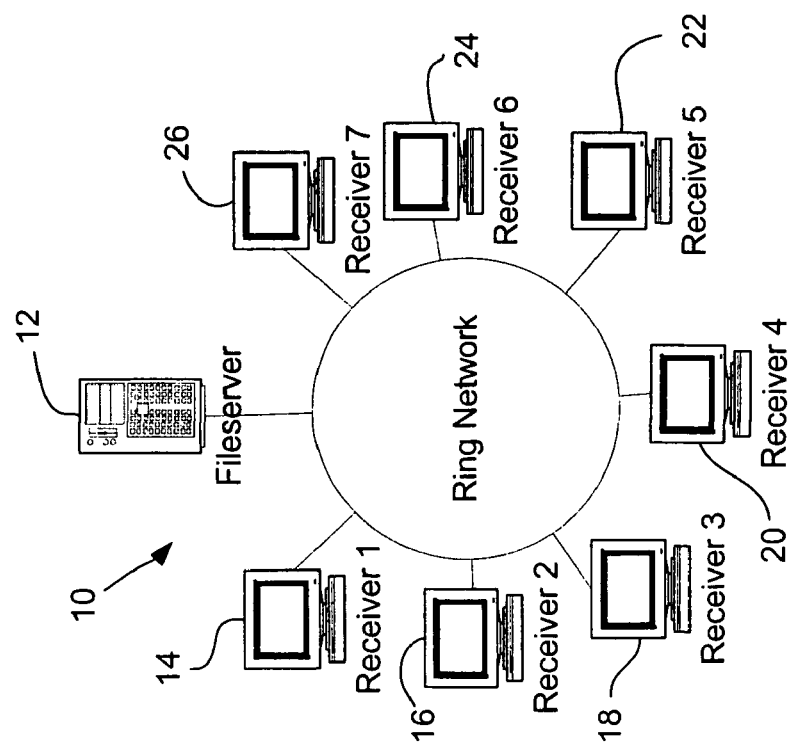
FIG. 1 illustrates a ring network having a file server and a plurality of receivers configured to distribute content in accordance with the present invention.

FIG. 1 illustrates a preferred topology of a network configured to transfer files using the content distribution manager of the present invention. In FIG. 1, a ring network 10 is illustrated. Network 10 includes a file server 12 and seven computers here shown as receivers 14, 16, 18, 20, 22, 24, 26. The illustrated network is a ring network in which each node on the network has two branches connected to it as shown here. In the network of FIG. 1, data flow through the ring network is counter-clockwise. In other words, receiver 14 is downstream of file server 12, receiver 16 is downstream of receiver 14, receiver 18 is downstream of receiver 16, receiver 20 is downstream of receiver 18, receiver 22 is downstream of receiver 20, receiver 24 is downstream of receiver 22, and receiver 26 is downstream of receiver 24. File server 12 is the demarcation between downstream and upstream. In other words, all the receivers on network 10 are defined as downstream from file server 12.

The ring network of FIG. 1 is preferably configured to permit different branches of the network to simultaneously carry different data. When employing a protocol supporting such communication, any branch (or "leg") of the network extending between any two receivers can carry different data than any other branch of the network extending between two other receivers.

The ring network of FIG. 1 may also be configured as token ring network—a ring communications protocol that permits data transmission by only one receiver at a time.

Figure 2:
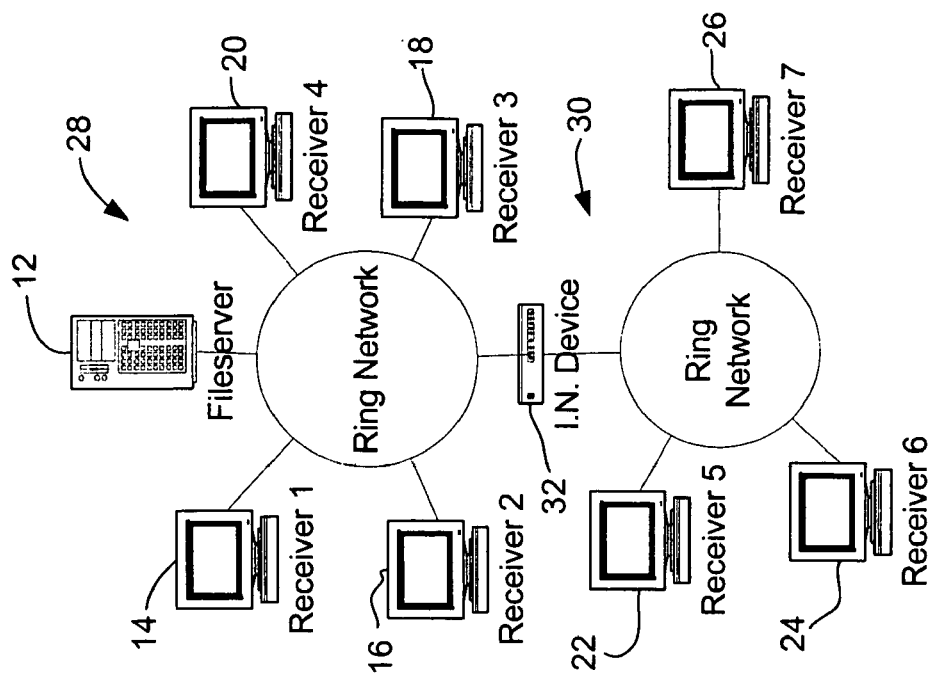
FIG. 2 illustrates an alternative embodiment of the network of FIG. 1 that is comprised of two sub-networks, each sub-network being a ring network, and wherein each of the two ring networks are coupled together with an internetworking device, e.g. such as a gateway or a bridge.

FIG. 2 illustrates an alternative to the network of FIG. 1, in which first and second ring networks 28 and 30 are coupled together with an internetworking device 32, such as a bridge. In this network configuration, file server 12 and receivers 14, 16, 18, and 20 are coupled together to form first ring network 28. Receivers 22, 24 and 26 are coupled together to form a second ring network. The internetworking device 32 is coupled to and between nodes on each of the ring networks to permit content to be distributed from a receiver or file server on network 28 to a receiver on network 30.

Figure 3:
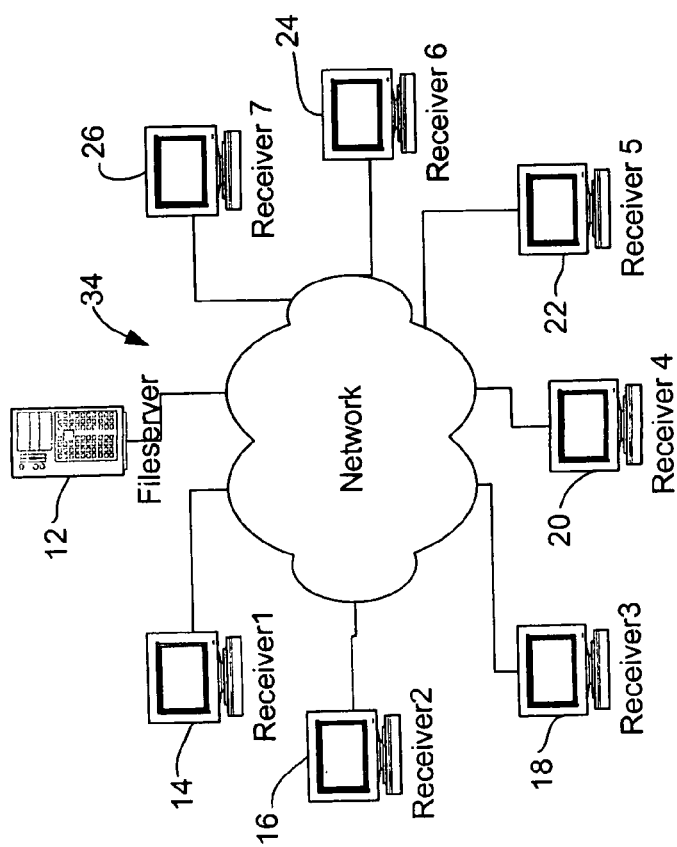
FIG. 3 is a representation of a network in accordance with the present invention.

FIG. 3 illustrates a generic network 34 in accordance with the present invention that couples file server 12 and receivers 14, 16, 18, 20, 22, 24, and 26. Network 34 can have a star, mesh, ring, bus, tree, mixed or hybrid topology. It may include a public switched network such as the Internet. It may be a single network or a network of networks.

Figure 4:
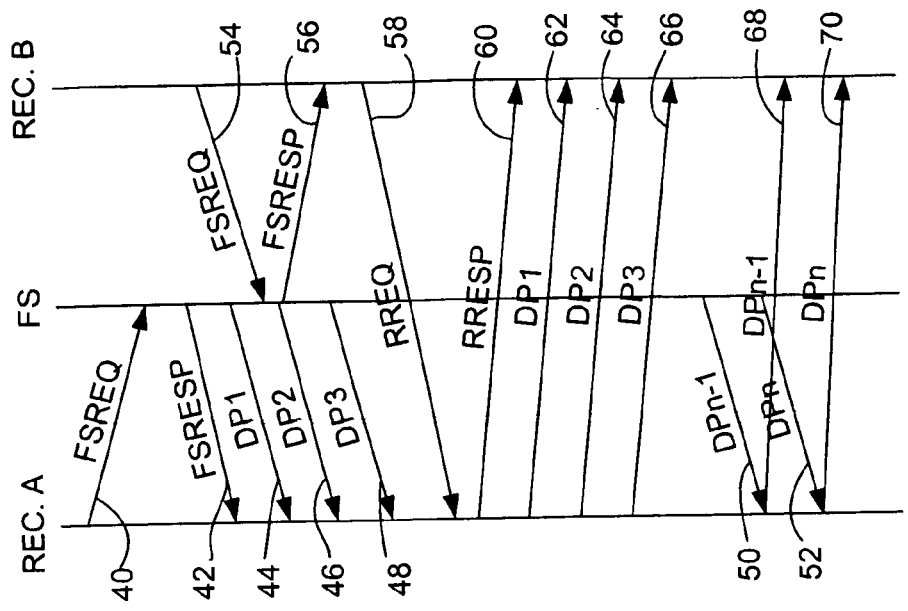
FIG. 4 is a representation of the communications flow between any two receivers and a file server of any of the networks of FIGS. 1-3.

FIG. 4 represents the communications flow between a first receiver (Rec. A"), a second receiver ("Rec. B") and a file server ("FS"). FIG. 4 illustrates a preferred method of handing off a request for specific content from a file server to a receiver that is already receiving the content. Receiver A and Receiver B in FIG. 4 are any of the receivers 14, 16, 18, 20, 22, 24, or 26 in FIGS. 1-3. File server "FS" is file server 12 of FIGS. 1-3.

In FIG. 4, each message between devices on the network is represented as an arrow. The arrow extends from the device initiating the message to the device receiving the message. Each message is typically in the form of a data packet or packets, each packet being comprised of a sequence of bits and having (1) an address indicating the device on the network which shall receive the message and (2) the actual contents of the message. The messages may be configured to control the process of transferring data (e.g. to initiate a data transfer connection or reject a data transfer connection) or they may include the data itself.

The initial step of the process is the transmission of a request 40 for specific content from Receiver A to file server FS. The specific content that a receiver requests is typically stored as a file in a data storage device in file server FS.

When file server FS receives request 40, a content distribution management (CDM) system of file server FS determines whether or not file server FS should accept request 40 and establish a connection. The CDM system responsively examines internal electronic records in file server FS that indicate the current connections serviced by file server FS.

If this examination indicates that file server FS is already servicing another receiver, and is providing it with the same content as that requested by request 40, it rejects the connection.

If the examination indicates that file server FS is not currently providing the request 40 content, the CDM accepts the connection and file server FS is directed to provide that content to the requesting receiver—in this case Receiver A.

In the example illustrated in FIG. 4, the CDM system determines that file server FS should provide the contents indicated by request 40, and transmits response 42 to Receiver A. This response indicates to Receiver A that file server FS has accepted the connection and shall provide the requested content. It should be recognized that response 42 need not be a separate and distinct packet of data. Indeed, it may be a portion of a packet containing other information.

Figure 5:
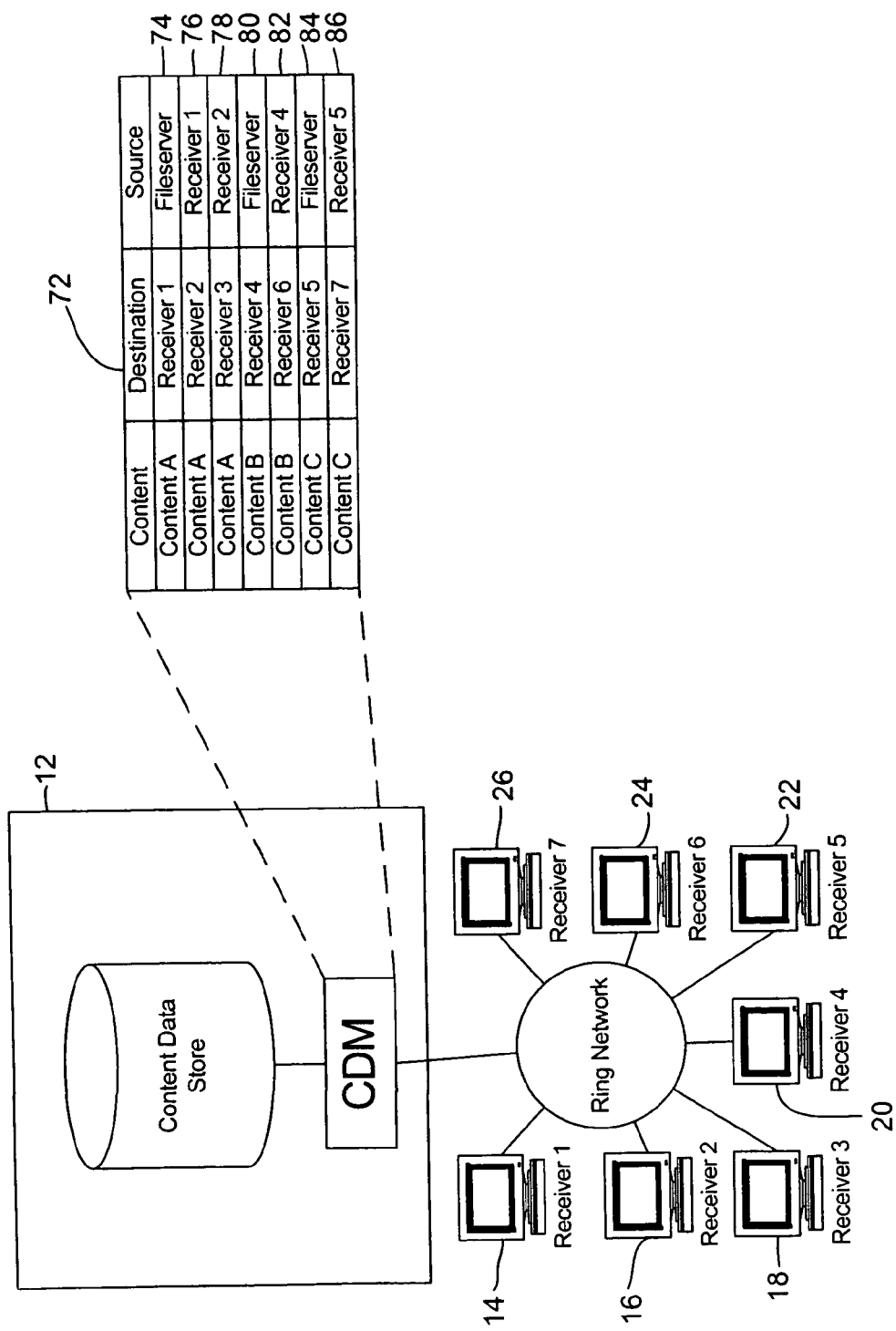
FIG. 5 is a detailed representation of the network of FIG. 1 illustrating the content distribution manager and its data structures.

Substantially simultaneously with its transmission of response 42, the CDM system generates and stores an internal electronic record indicating the existence of a connection as well as the receiver and the specific content associated with that connection (see FIG. 5). In this case, the receiver is Receiver A and the content is the content requested in request 40.

In this manner, file server FS makes an electronic record of each connection when that connection is established. This record is later used by the CDM system to decide whether to accept or reject future content requests.

Once the connection has been established, file server FS transmits a series of data packets 44, 46, 48, 50 and 52 that include portions of the requested content. The number of packets will vary depending upon the size of the requested content.

A second receiver, Receiver B, transmits a request 54 to file server FS for specific content stored thereon. The content requested by Receiver B is the same as the content previously requested by Receiver A in request 40. As in the case of request 40, request 54 includes data identifying the specific content that Receiver B wishes to receive.

Note that file server FS receives request 54 while it is transmitting data packets 44-52 to Receiver A. Thus, a request for specific content can be generated by a second receiver and can be received and processed by file server FS while file server FS is in the process of servicing a previous content request (or requests) and their associated connections.

When file server FS receives request 54, the CDM system determines whether or not file server FS should accept request 54 and establish a connection. The CDM system responsively examines internal electronic records in file server FS that indicate the current connections serviced by file server FS.

In the present example, this examination indicates that file server FS is already servicing Receiver A, providing it with the same content as that requested by request 54. This record was created by the CDM system on file server FS when the CDM system accepted the connection in response to request 40. Thus, when a connection is established, any future requests for the same content are preferably rejected.

If the examination indicates that file server FS is not currently providing the requested content, the CDM accepts the connection and file server FS is directed to provide that content to the requesting receiver—in this case Receiver B.

In the example illustrated in FIG. 4, however, the CDM system determines that file server FS should not provide the requested content to Receiver B, since it is already providing the content to Receiver A. The CDM system determines this by comparing the content identified by request 54 with the record of the content being provided to Receiver A. Since the records match, the CDM prepares file server response 56, incorporating within the response the identity of Receiver A as the preferred source for the requested content. File server FS then transmits file server response 56 to Receiver B over the network.

When Receiver B receives response 56, it extracts the identity of the preferred content source (in this case, Receiver A) from file server response 56. It may do this directly, if the actual network address is embedded in response 56, or it may do it indirectly, such as by extracting the identity of Receiver A from a related data structure.

Receiver B then generates a second request for the desired content called "receiver request" (RREQ) 58. Receiver B transmits this request over the network to Receiver A.

When receiver A receives request 58, it begins to transmit the requested content to Receiver B over the network. Note that Receiver A is preferably configured to receive packets of data from file server FS and to transmit them to Receiver B in an interleaved or overlapping fashion. Receiver A is preferably configured to relay the packets with the identical content by changing the recipient identified in the packets sent from file server FS from Receiver A to Receiver B. This is most easily performed when Receiver A is configured to maintain a copy of several recently received packets in an internal packet cache where they are available temporarily for readdressing and forwarding to Receiver B. Alternatively (and less efficiently) Receiver A is configured to construct new packets of data from an internal memory store containing a contiguous electronic record of the packet data that it previously received and extracted from packets sent by file server FS. This second method requires the construction (or rather reconstruction) of data packets and thus requires additional time and computing bandwidth from the processor of Receiver A.

As described above, a continuous stream of packets from file server FS can be received one-at-a-time by Receiver A and forwarded, either identically or in repackaged form, to Receiver B. These transfers preferably overlap in time and occur substantially simultaneously. Thus, while Receiver A is receiving content from file server FS and before the content has been received completely, Receiver A transmits the same content to Receiver B. In this preferred configuration of Receiver A, it need not wait until the entire content has been completely received before sending portions of that data to another receiver.

An example of the overlapping transfers that the file server and the receivers are configured to provide is illustrated in FIG. 4.

Once Receiver A accepts receiver request 58, it transmits receiver response 60 (RRESP) indicating its acceptance of the connection with Receiver B. Receiver A then transmits the content to Receiver B as a series of packetized data, including packets DP1 to DP3 (packets 62, 64, and 66) previously received by Receiver A as packets 44, 46, and 48. As further shown in FIG. 4, Receiver A can receive subsequent packets from file server FS and, having received them, transmit them to Receiver B. As shown by the transmission of packets $DP_{N-1}$ and $DP_N$ (50, 52) from file server FS to Receiver A, and the same packets $DP_{N-1}$ and $DP_N$ (68, 70) from Receiver A to Receiver B, the interleaving of data packets can be done on a packet-by-packet basis.

This configuration is particularly beneficial when the network permits the transmission of different data on each leg of the network. Some ring networks provide this capability and therefore are particularly well suited to this overlapping transmission and receipt of data packets.

File server FS incorporates the CDM system, which determines whether or not the requested connection shall be accepted or rejected by file server FS. The CDM system does this based upon the status of the records it maintains in its data store. These records identify the connections established by the CDM system.

FIG. 5 illustrates file server FS and Receivers 1-7 coupled together to form a network for distributing content. While a ring network is shown in FIG. 5 and is particularly suitable for use in the present invention, any network topology coupling the file server FS and Receivers 1-7 would be acceptable, for example, any of the networks shown in FIGS. 1-3 and described in the associated text.

In the preferred embodiment of FIG. 5, the CDM system generates and maintains several electronic records shown in tabular form as Table 72 that indicate the current connections serviced by file server FS. As each connection is established between a receiver and the file server, the CDM system makes a corresponding electronic record. These electronic records preferably associate each, receiver that is connected to the file server with the specific content the receiver is receiving via that connection. In an alternate and preferred embodiment, the CDM generates and maintains electronic records indicative of the connections that have been handed off from file server FS to other receivers in the network.

In the preferred embodiment of FIG. 5, these records are shown schematically in tabular form. Each line of table 72 corresponds to a record generated and maintained by the CDM system.

The first line 74 of the table associates the content (Content A) being transferred, in the first column, the receiver of that content (Receiver 1) in the second column, and the immediate provider or source of that content in the third column (the File server). The record represented by the first line shows that Content A requested by Receiver 1 is being provided by file server FS.

The second line 76 of the table associates the same content (Content A), with the recipient of that content (Receiver 2) and the immediate provider of that content (Receiver 1). The record represented by the second line indicates that Receiver 2 is receiving Content A from Receiver 1. This record was created by the CDM system when it handed off a connection request made by Receiver 2 to Receiver 1, rather than creating a second connection for the identical content (Content A) with file server FS. See FIG. 7.

The third line 78 of the table associates the same content as the foregoing records (Content A) with the recipient of that content (Receiver 3) and the immediate provider of that content (Receiver 2). The record represented by the third line indicates that Receiver 3 is receiving Content A from Receiver 2. This record was created by the CDM system when it handed off a connection request made by Receiver 3 to Receiver 2. At the time this record was created by the CDM system, Receiver 2 was the last receiver in the chain of recipients of Content A. See, FIG. 7.

The fourth line 80 of the table associates new Content B, different from the previous Content A, with the recipient of that content (Receiver 4) and the immediate provider of that content (file server FS). This record was created by the CDM system when it received a request for Content B from Receiver 4 and accepted a connection for that content. At the time this record was created by the CDM system, there were no existing connections to provide Content B.

The fifth line 82 of the table associates Content B with a second recipient of that content, Receiver 6, as well as with the immediate provider of that content, Receiver 4. This record was created by the CDM system when it received a request for Content B from Receiver 6 after the connection between file server FS and Receiver 4 was established.

The sixth line 84 of the table associates new Content C, different from Content A and Content B, with the recipient of that content, Receiver 5 and the immediate provider of that content, file server FS. This record was created by the CDM system is response to a request for that content from Receiver 5. At the time this record was created an the connection established, there were no existing connections to provide Content C.

The seventh and final line 86 of the table associates Content C with a second recipient of that content, Receiver 7 as well as with the immediate provider of that content, Receiver 5.

Each of the electronic records shown schematically in table 72 are electronic digital representations of a connection for transferring specific content requested by a receiver on the network. While FIG. 5 shows the records as being stored on the file server, they may also be stored remotely and be electronically accessible by the CDM system. FIG. 5 likewise illustrates the records as a single table. They may be in this form, or alternatively in the form of multiple tables that are linked together, or in any other electronic digital data structure that associates each receiver with the content it is receiving, such as lists or arrays.

The records are preferably stored in solid state memory devices for quick access, such as semiconductor devices, although other devices such as disk drives may be acceptably fast.

Figure 6:
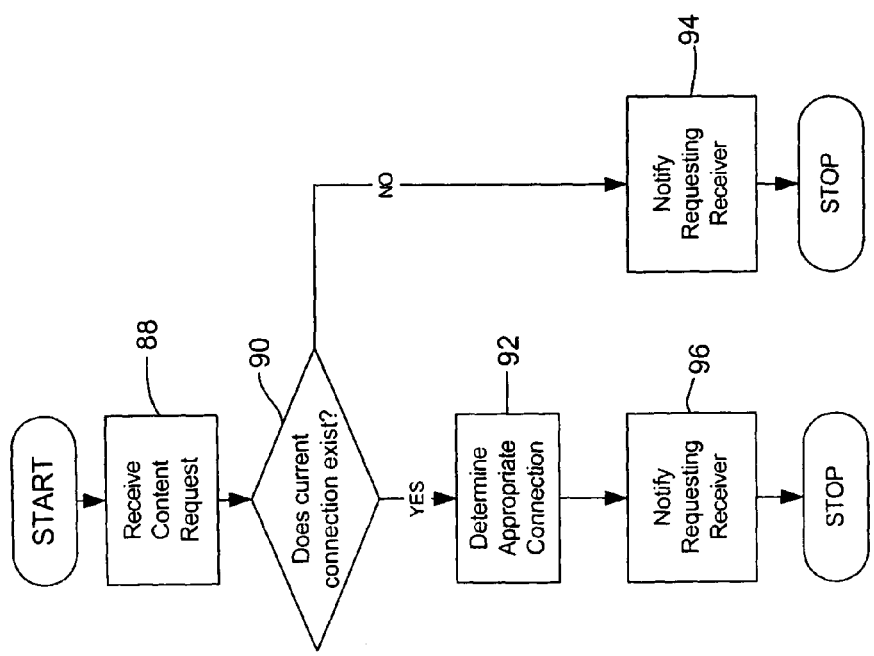
FIG. 6 is a flow chart of the communications between two receivers and a file server when the two receivers request the same content.

FIG. 6 illustrates the logical configuration of the CDM system. It represents the steps performed by the CDM system in determining whether to accept or reject a connection request sent to it by a receiver.

The overall process including the transfer of data packets comprising the requested content is illustrated in FIG. 4, which shows the CDM system accepting a connection with Receiver A, and rejecting a connection with Receiver B. FIG. 6 illustrates the logical configuration and operation of the CDM system when it determines whether to accept or to reject a connection, as well as how it hands off a connection request to another receiver.

In step 88 the CDM system receives a connection request from a receiver. The connection request includes data identifying the receiver originating the request and data identifying the specific content requested by that receiver.

In step 90 the CDM system determines whether there is an existing connection that is already providing the requested content to another receiver. In the preferred embodiment, the CDM system searches the electronic records exemplified in FIG. 5 to determine whether file server FS is currently providing the requested content. If file server FS is currently providing the requested content the CDM system proceeds to step 92. If not, the CDM system proceeds to step 94.

In step 92, the CDM system determines which receiver it will hand the connection request off to. One method of performing this step is for the CDM system to identify in the electronic records any receiver that is currently being provided with the requested content. Alternatively, the CDM system may search the electronic records for a preferred connection based upon pre-programmed selection criteria. Using the existing connections shown in FIG. 5 as an example, if the CDM system receives a new connection request for Content A—a connection that already exists—the CDM system can be configured to select the very first connection it identifies, which would be Receiver 1. The CDM system can be configured to select the receiver at the end of an existing chain of receivers. In the case of a request for Content A, this would be Receiver 2. These possible configurations of the CDM system should be considered as exemplary, as other selection criteria are acceptable.

In step 96 the CDM system, having determined the appropriate connection, notifies the requesting receiver that it is rejecting the connection requested by the requesting receiver. This notification preferably identifies the receiver to which the CDM system is handing off the connection request (i.e. the receiver or receivers determined in step 92).

As part of this notification process, the CDM system may make an electronic record of the requesting receiver, the requested content and the receiver to which it handed off the connection. Examples of such records are shown in lines 2, 3, 5, and 7 of FIG. 5. The CDM system may do this automatically, when it notifies the requesting receiver of the preferred receiver from which it should request the content. Alternatively, it may wait for a confirmation message (not shown) from the requesting receiver indicating that the requesting receiver has indeed established a connection with the receiver to which it was handed off.

If the file server FS is not currently providing the requested content via an existing connection, it proceeds to step 94. In step 94, the CDM system notifies the requesting receiver that it accepts the requested connection and will provide the requesting receiver with the requested content. Again, the CDM system preferably makes an electronic record of all connection requests it is servicing, such as this one. See, e.g., lines 1 and 4-6 of Table 72 in FIG. 5.

Figure 7:
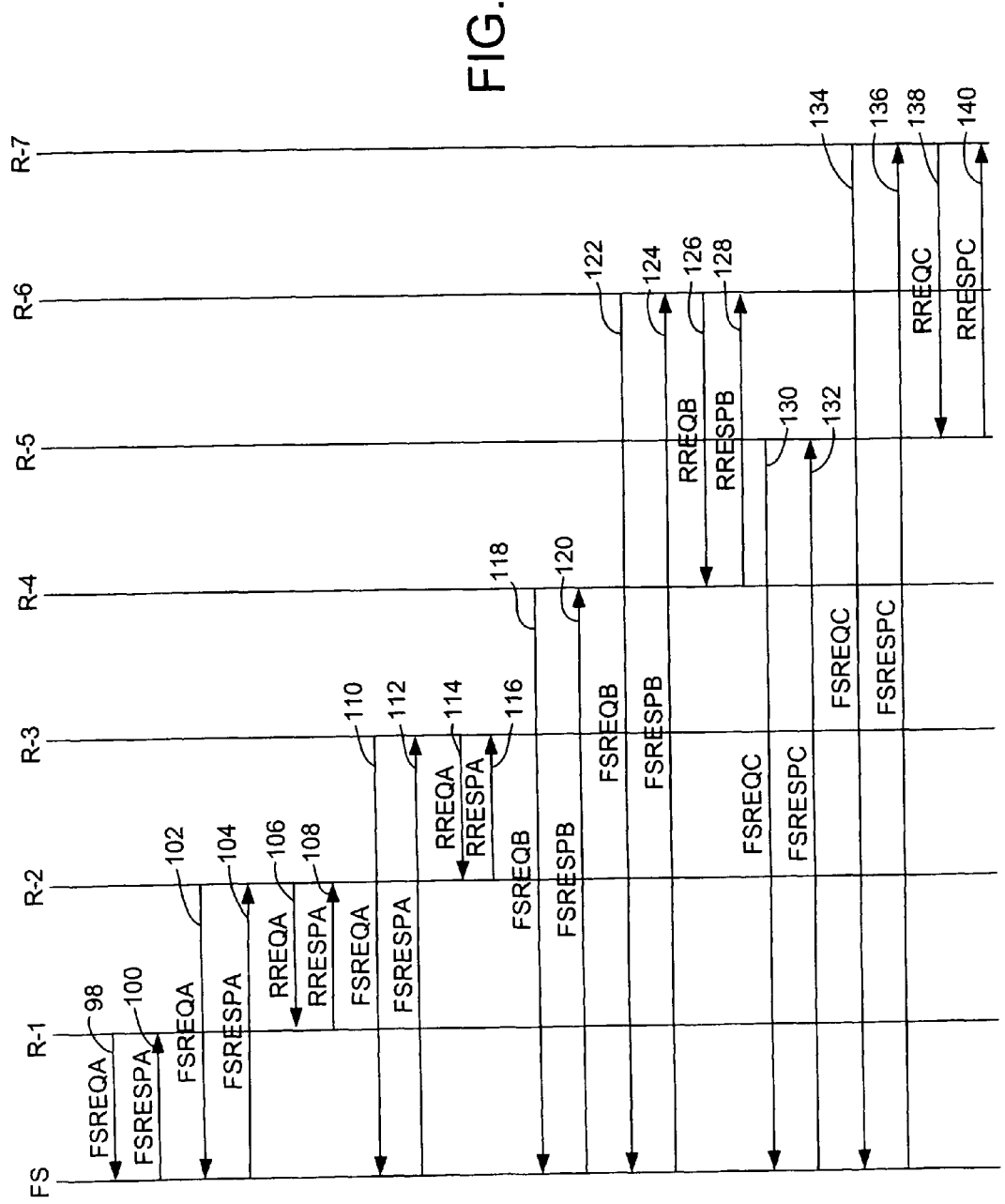
FIG. 7 is a data communications diagram illustrating how several different connections between receivers and the file server are established.

FIG. 7 is an illustrative example of one way in which the connections of the FIG. 5 table can be created. It shows how the CDM system, configured to perform the process illustrated in FIG. 6, would sequentially respond to various connection requests made by any of Receivers 1-7 shown in the foregoing FIGURES. It should be understood that the chart in FIG. 7 is merely illustrative of a typical process of establishing multiple connections and handing off connection requests provided by the CDM system.

In the example of FIG. 7, Receiver 1 ("R-1") transmits connection request 98 for specific content, Content A, to file server FS. This is identified in FIG. 7 as file server connection Request A ("FSREQA").

Following the process identified in FIG. 6, the CDM system on file server FS determines that no current connections for Content A exist and notifies Receiver 1 that it accepts the connection by file server response "FSRESPA" 100. The CDM system concurrently makes an electronic record (i.e. line 1 of the table in FIG. 5) of the connection. Once this connection or any other connection in FIG. 7 has been established, data is transferred as described, for example, in FIG. 4.

Next, Receiver 2 ("R-2") transmits a request 102 for the same content (Content A) to file server FS by the second file server request "FSREQA." Following the process of FIG. 6, the CDM system determines that the connection already exists with Receiver 1 and notifies Receiver 2 of that fact by the second file server response "FSRESPA" 104. The CDM system concurrently makes an electronic record (i.e. line 2 of the table in FIG. 5) of the proposed connection with Receiver 1.

Responsive to this notification, Receiver 2 is configured to transmit a subsequent receiver connection request 106 for Content A ("RREQA") to Receiver 1, identified by file server FS.

In response to RREQA, Receiver 1 (which receives Content A from file server FS) forwards Content A to Receiver 2, as indicated by receiver response 108 for Content A ("RRESPA").

In a similar fashion, Receiver 3 requests (110) Content A from file server FS (the third "FSREQA"), is rejected (112) and notified that the proper source is Receiver 2 (the third "FSRESPA"), requests (114) Content A from Receiver 2 (the second "RREQA") and receives (116) Content A from Receiver 2 (the second "RRESPA"). The CDM system concurrently makes an electronic record (i.e. line 3 of the table in FIG. 5) of the connection.

Receiver 4 subsequently and similarly requests (118) Content B from file server FS ("FSREQB"), and its connection request 118 is honored (120), since there are no pre-existing connections to Content B ("FSRESPB"). The CDM system concurrently makes an electronic record (i.e. line 4 of the table in FIG. 5) of the connection.

Receiver 6 subsequently and similarly requests (122) Content B from file server FS (the second "FSREQB"), is rejected by file server FS, and is notified (124) by file server FS that Receiver 4 is the proper connection (the second "FSRESPB"). The CDM system concurrently makes an electronic record (i.e. line 5 of the table in FIG. 5) of the connection to Receiver 4.

Receiver 6 subsequently and similarly requests (126) Content B from Receiver 4 ("RREQB"), and Receiver 4 responsively provides (128) Receiver 6 with Content B ("RRESPB").

Receiver 5 subsequently and similarly requests (130) Content C from file server FS ("FSREQC"), and its connection request is honored (132), since there are no pre-existing connections to Content C ("FSRESPC"). The CDM system concurrently makes an electronic record (i.e. line 6 of the table in FIG. 5) of the connection.

Receiver 7 subsequently and similarly requests (134) Content C from file server FS (the second "FSREQC"), is rejected (136) by file server FS, and is notified by file server FS that Receiver 5 is the proper connection (the second "FSRESPC"). The CDM system concurrently makes an electronic record (i.e. line 7 of the table in FIG. 5) of the connection to Receiver 5.

Receiver 7 subsequently and similarly requests (138) Content C from Receiver 5 ("RREQC"), and Receiver 5 responsively provides Receiver 7 with Content C ("RRESPC") (140).

Figure 8:
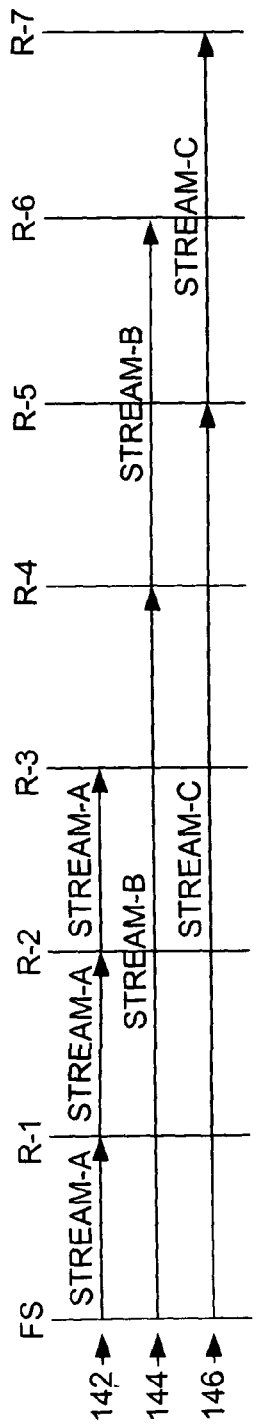
FIG. 8 illustrates the total bandwidth used by the multiple connections illustrated in FIG. 7.

FIG. 8 illustrates the simultaneous data streams created by the foregoing sequence of connections shown in FIGS. 5 and 7. When file server FS and Receivers 1-7 are coupled together in the ring network arrangement of FIG. 1 or 2, each different branch or leg of the network can simultaneously carry different data. There are three different data streams created by the sequence of connections shown in FIG. 7.

The first stream 142 is STREAM-A, representing the stream of network packets comprising Content A. STREAM-A is transmitted from file server FS to Receiver 1, thence to Receiver 2, and thence to Receiver 3.

The second stream 144 is STREAM-B, representing the stream of network packets comprising Content B. STREAM-B is transmitted from file server FS to Receiver 4 and thence to Receiver 6.

The third stream 146 is STREAM-C, representing the stream of network packets comprising Content C. STREAM-C is transmitted from file server FS to Receiver 5 and thence to Receiver 7.

Note that each leg of the network carries, at most, three streams of traffic, corresponding in toto, to the number of packets necessary to sequentially transmit one copy of Content A, one copy of Content B, and one copy of Content C. Assuming each of Content A, B and C have the same number of packets, N, the maximum total throughput of the busiest link in the network necessary to transmit all requested content to all seven receivers is 3N. The network load has been distributed relatively evenly across each leg of the network by handing off network connections in accordance with the present invention.

Figure 9:
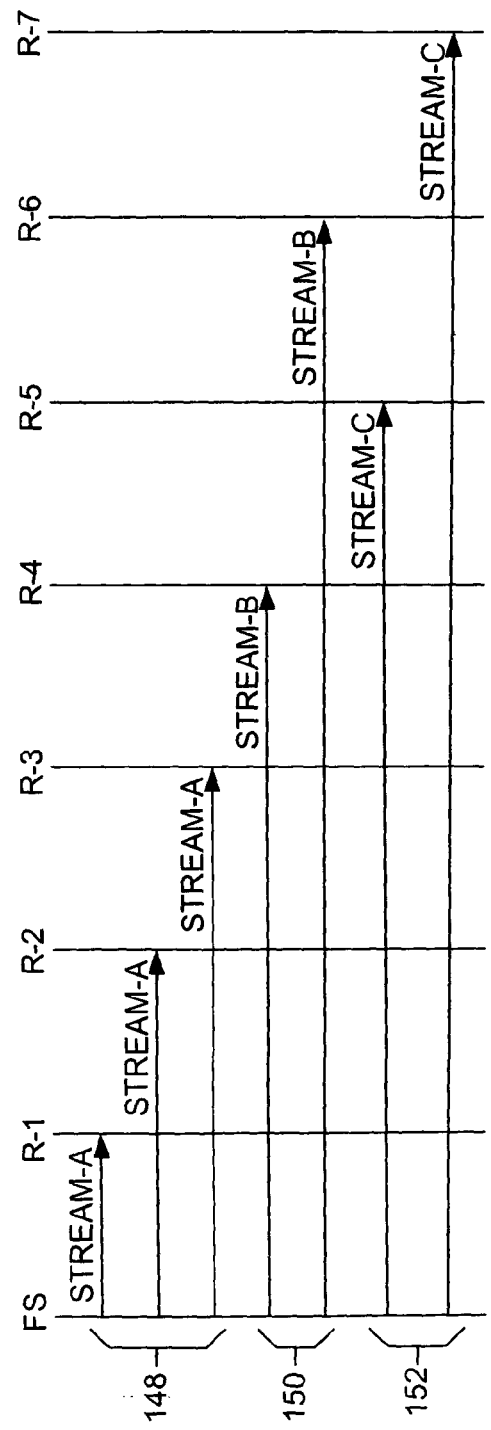
FIG. 9 illustrates the total bandwidth used by a prior art network if it was used to make the identical file transfers of FIGS. 7 and 8.

Compare this with the network traffic required using the traditional prior art method of distributing content, in which all the connections are made with file server FS and all the data streams originate at file server FS. In this arrangement, shown in FIG. 9, the network leg between file server FS and Receiver 1 is the most heavily burdened portion of the network, and is responsible for originating and sequentially transmitting all seven data streams: three sequential transmissions 148 of STREAM-A which are followed by two sequential transmissions 150 of STREAM-B which are followed by two sequential transmissions 152 of STREAM-C. This is the network load that results when file server FS accepts all connection requests The maximum network throughput necessary to distribute the same content to Receivers 1-7 using the prior art method is therefore 7N, which is carried by the leg extending between file server FS and Receiver 1. Thus, the time necessary to distribute the content to all seven receivers is over twice as great, and file server FS is burdened with over twice the number of connections.

This reduction in network traffic and the total number of connections to file server FS is, of course, only true of the example shown in FIGS. 4-8 and described in the corresponding text. Actual throughput may result in greater or lesser reductions in network traffic and file server connections. For example, if all seven receivers requested Content A, a single connection would be opened on file server FS, and on each of Receivers 1-7.

In this arrangement, Content A would be transmitted from file server FS to Receiver 2, thence to Receiver 3, thence to Receiver 4, thence to Receiver 5, thence to Receiver 6, and thence to Receiver 7, each receiver storing a copy of the packets and forwarding a copy to the next receiver downstream. The maximum bandwidth required in this arrangement would be "N". in comparison, the maximum bandwidth using the traditional arrangement of FIG. 9 would be 7N. Thus, a seven-fold increase in throughput (i.e. a reduction from 7N to N packets) would be provided by distributing Content A to all 7 receivers using the present invention.

In the discussion herein, the term "file server" has been used to denote one or more network devices that are responsive to requests for digital data, and provide that data by serving up stored files, or video or audio streams generated on-the-fly. The term "file server" as used herein is intended to broadly describe any of a variety of devices such as traditional Ethernet-type file servers as well as specialized file servers for streaming media, often called a "streaming media server", "streaming server", "streaming video server", streaming audio server", "video server", "audio server", "Internet appliance", "streaming media appliance" "streaming appliance", and "streaming media network appliance", for example.

Data transmitted over a network is generally considered a data "stream" if it is consumed upon receipt, typically by viewing and listening (in the case of a video data stream) or listening (in the case of an audio data stream). Data streams typically have the characteristic of being able to accommodate packet loss. In the case of video or audio data streams, for example, an occasional dropped packet usually does not require retransmission, since the encoding algorithms for the video or audio data re loss tolerant.

The processes and devices for requesting and transmitting a file as described herein, should be understood to cover not only files that are identical to files provided by the server, but files that are substantively the same, although encoded differently. A file that is encoded before transfer from the fileserver to the receiver is still the same file for purposes of this application.

For example, streaming appliances often incorporate a video or audio encoder (such as a MPEG encoder) between the storage device on the server and the network. The file or stream that is available on the server is encoded by these encoders to format the requested data such that it can be presented to the user by the requesting receiver.

The transmission protocols used by the network may (although are not required to) include any Internet transport protocol, such as IP, TCP, UDP, or ICMP or variations thereof. The protocols used for transmitting data streams (i.e. streaming protocols) may include RTP (RFC 1889), RSTP (RFC 2326), Shoutcast Streaming Protocol, (see also MP3 streaming, HTTP streaming, and Icecast), Microsoft MMS (Microsoft Media Server protocol), MMSU (MMS over UDP), MMST (MMS over TCP), Microsoft MSBD (Microsoft Media Stream Broadcast Distribution protocol), HTTP (RFC 2616) or variations thereof. These protocols are exemplary.

The data may be unpackaged, or may be packaged in any of a variety of data formats, including proprietary formats such as Apple Quicktime, Microsoft ASF, Microsoft AVI, Windows Media Metafiles, RealSystem Information Files (by RealNetworks) or variations thereof; or by open standard formats such as SMIL (World Wide Web Consortium—used by RealNetworks and Quicktime), MPEG-4, MPEG-7, or MIME types (RFC 1521, 1522).

Any of the files or data streams may be compressed or encoded (although are not required to be) by methods such as MPEG (MPEG-1, -2, -4), 11.261, H.263, H263+, H324, MJPEG (Motion JPEG) DV (Digital Video compression, such as DV-25 or DV-50); or by proprietary coding or compression methods such as RealVideoG2, Real 8 (RealNetworks), Sorenson Video (used by Quicktime), Microsoft Windows Media 8, On2, Pixelon, Tranz-Send, Intel Indeo, Cinepak, Motion Vector Quantization method (MVQ) and LessDATA codec.

Several of the devices identified above are preferred. For example, the internetworking devices identified above preferably comprise any of the routers, bridges, hubs or concentrators manufactured by Cisco Systems, Inc., 3COM, or Marconi. The servers, workstations and receivers are preferably those manufactured by Concurrent Computer Corporation, nCUBE or Unisys Corporation, such as the Concurrent Video Server, the Unisys Video Server, nCUBE's n4 streaming media appliance. Preferred servers include Optibase's MGw-2000, Vbrick's Vbrick 4300, Vantum's C1d, Pinnacle System's StreamGenie Presenter, Starbak's Torrent 100 streaming media server NOD The receivers may also be a Windows/Intel or Apple/Motorola personal computer preferably using a 3COM, Intel, or Marconi NIC (Network Interface Card).

For dedicated video applications, a preferred alternative receiver comprises any of the Motorola Set Top or Pace Set Top boxes, preferably using a NextLevel DSL NIC or Motorola DSL NIC. Exemplary set top boxes include the Motorola Streamaster products, such as the Streamaster 5000; the Cocom International Voyager set top box, Japan Computer Corporation's IBOX-1 set top box/Internet appliance; the VCON Falcon IP, set top videoconferencing appliance.

What is claimed is:

1. A method of handing off connections from a file server to a receiver, the method comprising the steps of:
   transmitting a file server request over a network for specific data from a first receiver to the file server;
   receiving the file server request at the file server;
   comparing the file server request with records of existing data connections currently being serviced by the file server to determine whether the file server is already transmitting the specific data;
   transmitting the specific data from the file server to the first receiver if the step of comparing indicates that the file server is not currently serving the specific data to another receiver by the existing data connections; and
   transmitting a file server response from the file server to the first receiver, said file server response including data indicative of a location of a second receiver on the network if the step of comparing indicates that there is an existing data connection for the specific data between the file server and the second receiver whereby the second receiver is currently receiving the specific data.

2. The method of claim 1 further comprising the steps of:
   transmitting a receiver request for the specific data from the first receiver to the second receiver after the step of transmitting a file server response;
   receiving the receiver request at the second receiver; and
   transmitting the specific data from the second receiver to the first receiver.

3. The method of claim 2, wherein the network is a ring network, and further wherein the first receiver, the second receiver and the file server are nodes on the ring network, and further wherein the first receiver is downstream of the second receiver.

4. The method of claim 1, further comprising the steps of:
   transmitting a second file server request over the network for the specific data from a third receiver to the file server;
   receiving the second file server request at the file server;
   comparing the second file server request with the existing data connections currently being serviced by the file server, said existing data connections including at least a connection between the file server and the second receiver for the specific data and a connection between the first receiver and the second receiver for the specific data; and
   transmitting a second file server response from the file server to the third receiver, said second file server response including data indicative of a location of the second receiver on the network, wherein said step of transmitting the second file server response occurs at least if the step of comparing the second file server request indicates that the first receiver is currently receiving the specific data.

5. The method of claim 4, wherein the network is a ring network and further wherein the file server, the first receiver and the second receiver, are nodes on the ring network, and further wherein the first receiver is downstream of the second receiver and the third receiver is downstream of the first receiver.

6. A method of reducing network congestion on a computer network having a file server, a first receiver downstream of the file server, and a second receiver downstream of the first receiver, the method comprising the steps of:
   the first receiver requesting a stream of digital data from the file server;
   the file server responsively establishing a first connection with the first receiver and providing the stream of digital data;
   the second receiver subsequently requesting data from the file server;
   the file server determining whether the data requested by the second receiver is the stream of digital data being provided to the first receiver, and if so, identifying the first receiver as an alternate source of the stream of digital data; and if the data requested by the second receiver is the stream of digital data being provided to the first receiver, the second receiver establishing a second connection with the first receiver responsive to the step of identifying and the file server and the first receiver simultaneously transmitting the stream of digital data to the first receiver and the second receiver, respectively, thereby reducing network congestion.

7. The method of claim 6, wherein the first and second connections overlap in time.

8. The method of claim 7, wherein the first receiver is configured to receive the stream of data from the file server as a series of packets, and to relay that series of packets to the second receiver.

9. The method of claim 6, wherein the stream of digital data comprises a plurality of packets of data sequentially transmitted by the file server, and further wherein the first receiver is configured to (1) sequentially receive the plurality of packets, (2) to sequentially save the plurality of packets upon their receipt for internal use by the first receiver, and (3) to sequentially forward each of said plurality of packets to the second receiver as each of said plurality of packets is received by the first receiver.

10. The method of claim 9, further comprising a first network branch coupling the file server and the first receiver, and a second network branch coupling the first receiver and the second receiver, and further wherein the first and second network branches are configured to simultaneously transmit different data.

11. A file server configured to hand off a network connection, the server comprising:
- a mass storage device having a file; and
- a content distribution system coupled to the mass storage device, wherein the content distribution system is configured to
  - receive a file server request for the file from a first receiver;
  - compare the file server request with records of existing file connections currently providing data streams to determine whether the file is being provided to any other receiver;
  - identify, in said records of existing file connections, a second receiver that is currently receiving said file as a data stream from said file server; and
  - transmit a file server response from the file server to the first receiver, said file server response identifying a location of the second receiver on the network, wherein said step of transmitting is responsive to said step of identifying a second receiver, and whereby the file server hands off said request for the file to the second receiver.

12. A computer network configured to hand off a network connection, comprising:
- a first means for receiving a digital data stream;
- a second means for receiving the digital data stream from the first means for receiving; and
- a file server networked to the first means for receiving and the second means for receiving, said file server comprising:
  - a means for receiving a first connection request for a specific data stream from the first means for receiving;
  - a means for comparing the first connection request for the specific data stream with at least one existing data connection between the file server and at least another receiver;
  - a means for accepting the first connection request if said means for comparing indicates that the file server has no existing connection supplying the specific data stream;
  - a means for storing an electronic record of the accepted first connection;
  - a means for receiving a second connection request for the specific data stream from the second means for receiving;
  - a means for comparing the second connection request for the specific data stream with the electronic record of the accepted first connection; and
  - a means for rejecting the second connection request if the means for comparing the second connection request indicates that the accepted first connection exists.

13. The computer network of claim 12, wherein the first means for receiving includes a first means for relaying the specific data stream to the second means for receiving.

14. The computer network of claim 12, further comprising a means for coupling the file server, the first means for receiving and the second means for receiving such that the first means for receiving is downstream of the file server, and the second means for receiving is downstream of the first means for receiving.

15. The computer network of claim 14, further comprising a means for internetworking the second means for receiving with the first means for receiving.

16. The computer network of claim 13, further comprising a third means for receiving the specific data stream, and further wherein the second means for receiving includes a means for relaying the specific data stream to the third means for receiving.

* * * * *